(12) United States Patent
Weber et al.

(10) Patent No.: US 10,525,818 B2
(45) Date of Patent: Jan. 7, 2020

(54) REAR SPOILER ARRANGEMENT FOR A MOTOR VEHICLE

(71) Applicant: Dr. Ing. h.c. F. Porsche Aktiengesellschaft, Stuttgart (DE)

(72) Inventors: Sebastian Weber, Esslingen (DE); Tobias Posch, Wimsheim (DE); Riccardo Bauer, Owen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/954,614

(22) Filed: Apr. 17, 2018

(65) Prior Publication Data

US 2018/0319269 A1 Nov. 8, 2018

(30) Foreign Application Priority Data

May 4, 2017 (DE) .......................... 10 2017 109 523

(51) Int. Cl.
*B60K 11/00* (2006.01)
*B60K 11/08* (2006.01)
*B62D 35/00* (2006.01)
*F01P 11/10* (2006.01)

(52) U.S. Cl.
CPC ............ *B60K 11/08* (2013.01); *B62D 35/007* (2013.01); *F01P 11/10* (2013.01); *F01P 2060/02* (2013.01)

(58) Field of Classification Search
CPC ........ B60K 13/02; B60K 11/04; B60K 11/08; B62D 35/007
See application file for complete search history.

(56) References Cited

U.S. PATENT DOCUMENTS

| 4,889,382 | A * | 12/1989 | Burst ..................... | B60K 11/08 296/180.5 |
|---|---|---|---|---|
| 6,170,904 | B1 * | 1/2001 | Schaedlich .......... | B62D 35/007 296/180.1 |
| 6,505,696 | B1 * | 1/2003 | Prevost ................. | B60K 11/04 180/68.4 |
| 7,036,871 | B2 * | 5/2006 | Adams ................. | B62D 35/007 180/903 |
| 7,111,898 | B2 * | 9/2006 | Rinklin ................ | B62D 35/007 296/180.1 |
| 7,708,335 | B2 * | 5/2010 | Wegener .................. | B60T 1/16 296/180.1 |
| 8,297,393 | B2 * | 10/2012 | Froeschle .............. | B60J 1/2008 180/68.1 |

(Continued)

FOREIGN PATENT DOCUMENTS

DE 102013112003 A1 4/2015

*Primary Examiner* — Hau V Phan

(74) *Attorney, Agent, or Firm* — Leydig, Voit & Mayer, Ltd.

(57) ABSTRACT

A rear spoiler arrangement is provided for a motor vehicle having a rear mounted engine, an intercooler for the rear mounted engine and a holding member for a spoiler apparatus being provided in a rear region of the motor vehicle. In each case at least one opening is provided in the spoiler apparatus and the holding member as an air guide to the intercooler. The rear spoiler arrangement includes an air guiding arrangement with at least one air guiding slat provided at least in the opening of the spoiler apparatus.

18 Claims, 3 Drawing Sheets

(56) References Cited

U.S. PATENT DOCUMENTS

| | | | | |
|---|---|---|---|---|
| 8,584,778 B2* | 11/2013 | Wolf | ................. | B60K 11/04 180/68.1 |
| 8,651,211 B2* | 2/2014 | Wolf | ................. | B62D 35/007 180/68.1 |
| 2011/0001329 A1* | 1/2011 | Froeschle | ............. | B60J 1/2008 296/76 |
| 2013/0062132 A1* | 3/2013 | Wolf | ................. | B62D 35/007 180/68.1 |
| 2013/0068547 A1* | 3/2013 | Wolf | ................. | B60K 11/04 180/68.4 |
| 2016/0229285 A1* | 8/2016 | Rutschmann | ......... | B60K 13/02 |

* cited by examiner

REAR SPOILER ARRANGEMENT FOR A MOTOR VEHICLE

CROSS REFERENCE TO RELATED APPLICATIONS

This application claims benefit to German Patent Application No. DE 10 2017 109 523.3, filed May 4, 2017, which is hereby incorporated by reference herein.

FIELD

The invention relates to a rear spoiler arrangement for a motor vehicle having a rear mounted engine. Furthermore, the invention relates to a motor vehicle having a rear mounted engine and a rear spoiler arrangement.

BACKGROUND

A rear spoiler arrangement or a motor vehicle having a rear spoiler arrangement are known, for example, from DE 10 2013 112 003 A1. Here, a mounting support is provided in the region of a rear mounted engine, on which mounting support a spoiler apparatus with a movable wing element is arranged, inter alia. In order to ensure air guidance to the rear mounted engine and here, in particular, to an intercooler, at least one opening is provided in the holding member which is configured as a mounting support. In order to make an air flow possible from the outside, that is to say from the outer region of the motor vehicle rear to the opening of the holding member or the mounting support, the spoiler apparatus likewise has an opening. Said opening is disadvantageous for design technology reasons, because it reveals a view of the mounting support for the observer. In addition, an optimum air flow in the direction of the mounting support is not ensured by way of an opening of this type in all operating situations of the motor vehicle.

SUMMARY

In an embodiment, the present invention provides a rear spoiler arrangement for a motor vehicle having a rear mounted engine, an intercooler for the rear mounted engine and a holding member for a spoiler apparatus being provided in a rear region of the motor vehicle. In each case at least one opening is provided in the spoiler apparatus and the holding member as an air guide to the intercooler. The rear spoiler arrangement includes an air guiding arrangement with at least one air guiding slat provided at least in the opening of the spoiler apparatus.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

One or more embodiments of the invention provide a rear spoiler arrangement or a motor vehicle having a rear spoiler arrangement adapted in such a way that the above mentioned disadvantages of the prior art are avoided.

One or more embodiments of the present invention provide an air guiding arrangement having at least one air guiding slat provided at least in the opening of the spoiler apparatus. This firstly ensures a visual protection, and secondly an air flow is guided by way of the air guiding slat in an optimum way to the holding member and therefore in the direction of an intercooler.

The holding member is advantageously configured as a mounting support, the spoiler apparatus, inter alia, being arranged on the mounting support.

The air guiding slat advantageously runs substantially perpendicularly with respect to the vehicle longitudinal axis. Here, the air guiding slat can have a surface element which is configured in such a way that an air flow can be deflected in the direction of the holding member. Here, the surface element of the air guiding slat is particularly advantageously configured as a curved surface element.

In one particularly advantageous embodiment, the air guiding arrangement has a frame arrangement with air guiding faces and with visual protection faces.

In order for it to be possible to adapt the air flow in an optimum way in different operating situations of the rear spoiler arrangement, the air guiding slat can be mounted movably in the air guiding arrangement and can be capable of being driven by way of a drive apparatus.

In one particularly advantageous embodiment, the spoiler apparatus has a lower shell element and a wing element which is mounted on the former, the wing element being arranged such that it can be adjusted in relation to the lower shell element, the air guiding arrangement of the spoiler apparatus being provided between the lower shell element and the holding member.

It can be particularly advantageous in the case of a motor vehicle having a rear spoiler arrangement of this type if the rear region is of closed configuration, for example is configured as a trunk lid or as a rear window. In contrast to motor vehicles which have a rear region with an air grille arrangement, new design possibilities are provided by way of the rear spoiler arrangement according to the invention.

Figure 1:
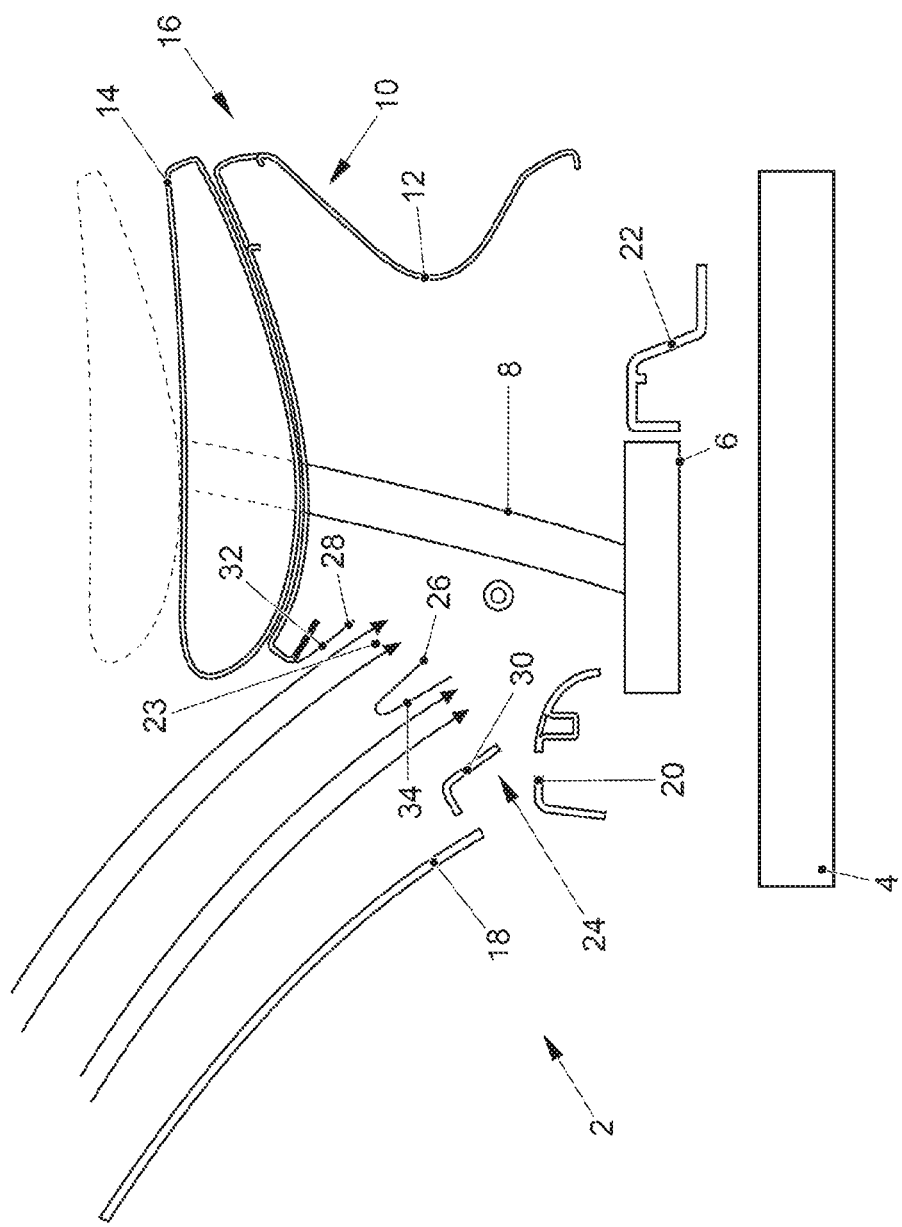
FIG. 1 diagrammatically shows a sectional view through a part of a rear region of a motor vehicle.

FIG. 1 shows a part of a rear region 2 of a motor vehicle which is not shown in further detail. An intercooler 4 of a rear mounted engine which is not shown in further detail is provided in the rear region 2. In the present exemplary embodiment, said intercooler 4 is arranged below a holding member 6 which is configured here as a mounting support. A multiplicity of structural elements can be provided on the mounting support 6. The mounting support has openings 7 for feeding air to the intercooler.

In the present example, a deploying member 8 of a deploying mechanism 9 (in this regard, see FIG. 3) of a spoiler apparatus 10 is provided merely diagrammatically. In the present exemplary embodiment, in a known way, the spoiler apparatus 10 has a lower shell element 12 and a wing element 14 which is mounted on the former. In a manner which is dependent on operating and/or driving situations, the wing element 14 can be extended or else retracted (a deployed position is indicated here in a dashed manner), in order to adapt the motor vehicle in an optimum manner to the respective boundary conditions with regard to the air flowing around it. In the present exemplary embodiment, the mounting support 6, the deploying member 8 of the deploying mechanism 9, and the spoiler apparatus 10 form a rear spoiler arrangement 16 which adjoins a rear window 18 of the rear region 2 substantially directly. 20 and 22 diagrammatically indicate vehicle body components.

Figure 2:
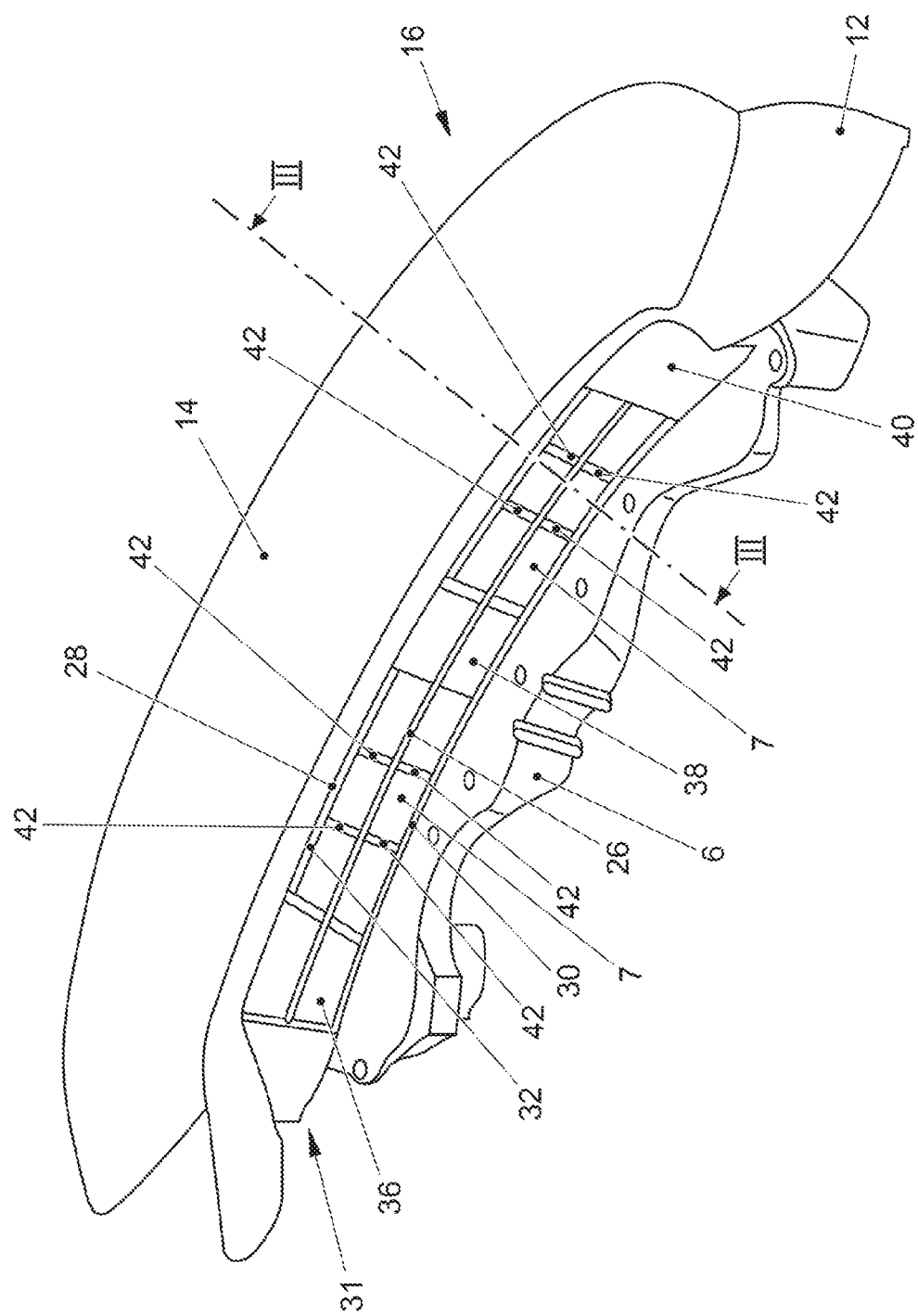
FIG. 2 shows a perspective view of a rear spoiler arrangement according to an embodiment of the invention.

A further opening 23 is provided between the lower shell element 12 and the mounting support 6 for supplying air from the outside toward the openings 7 of the mounting support 6, an air guiding arrangement 24 being provided according to the invention in said opening 23, of which air guiding arrangement 24 FIG. 1 shows an air guiding slat 26 and an upper air guiding face 28 and a lower air guiding face 30 of a frame arrangement 31 (in this regard, see FIG. 2, in particular).

The upper air guiding face 28 has a bent surface element 32, and the air guiding slat 26 has a curved surface element 34, as a result of which an airflow which is shown by way of arrows is diverted in an optimum manner in the direction of the intercooler 4.

FIG. 2 then shows a perspective view of the rear spoiler arrangement 16 according to the invention. It can be seen clearly that the air guiding slat 26 extends substantially perpendicularly with respect to a vehicle longitudinal axis. As has already been described under FIG. 1, the air guiding slat 26 is provided in a frame arrangement 31 which, moreover, has visual protection faces 36, 38 and 40 which are intended, in particular, to cover the deploying mechanism of the wing element 14. It should be clear that the frame arrangement 31 can of course have a multiplicity of air guiding slats 26. It is also possible to adapt the shape of the air guiding faces 28 and 30. Moreover, it is conceivable that the air guiding slat 26 is mounted movably in the air guiding arrangement 24 and therefore in the frame arrangement 32. In order for it to be possible to adapt it to the different operating situations, the air guiding slat 26 might then be capable of being driven by way of a drive device, it being conceivable that the opening 23 is closed completely or partially in a manner which is dependent on the number of air guiding slats at a standstill of the motor vehicle or during slow driving.

Figure 3:
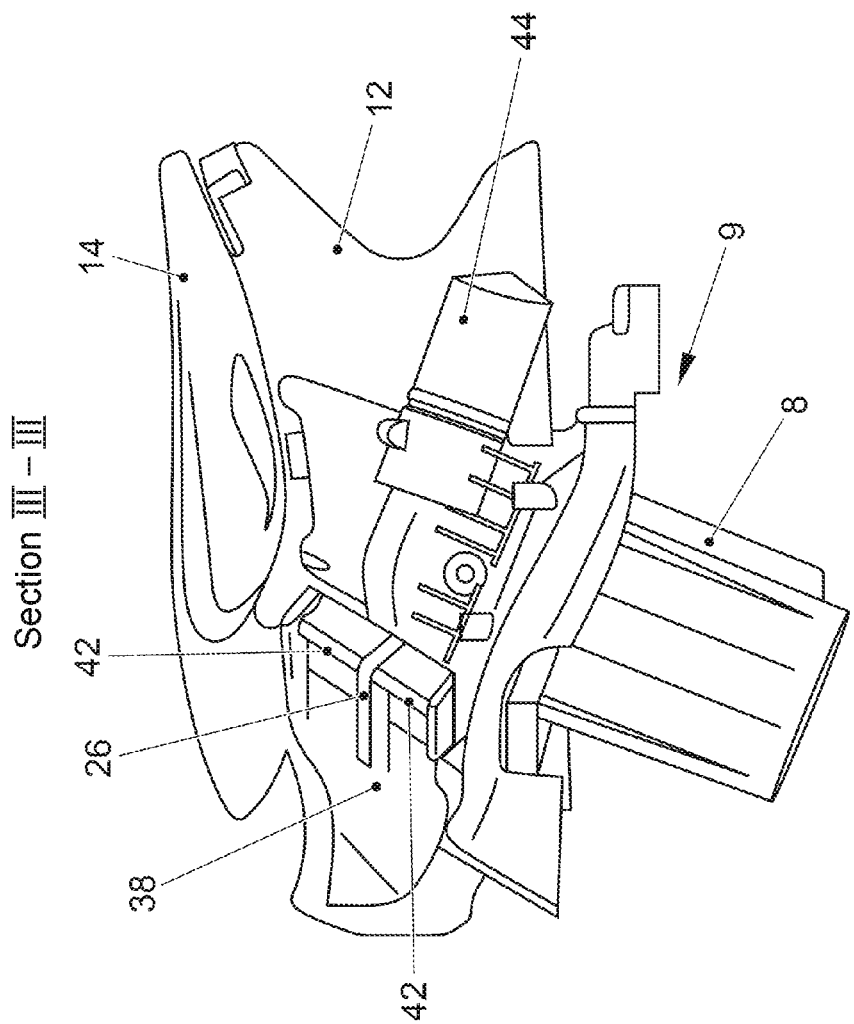
FIG. 3 shows a sectional view according to the section through the rear spoiler arrangement according to FIG. 2.

FIG. 3 shows a detailed view, which is a sectional view along the section of FIG. 2, of the deploying mechanism 9 with the deploying member 8 and a drive motor 44. The visual protection face 38 with rib elements 42 which serve to reinforce the air guiding arrangement 24 can be seen clearly here.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A rear spoiler arrangement for a motor vehicle, the rear spoiler arrangement comprising:
    a spoiler apparatus provided in a rear region of the motor vehicle, the spoiler apparatus including:
        a lower shell element,
        a wing element mounted on the lower shell element, wherein the wing element is configured to be extended, by a deploying mechanism, from the lower shell element into a deployed position and retracted, by the deploying mechanism, from the deployed position towards the lower shell element, and
        an opening that provides an air flow path to an intercooler of a rear mounted engine of the motor vehicle;
    a holding member for the spoiler apparatus; and
    an air guiding arrangement arranged in the opening of the spoiler apparatus,
    wherein the air guiding arrangement includes an air guiding slat configured to guide an air flow through the air flow path to the intercooler of the rear mounted engine.

2. The rear spoiler arrangement as claimed in claim 1, wherein the holding member is a mounting support on which the spoiler apparatus is mounted.

3. The rear spoiler arrangement as claimed in claim 2, wherein the opening of the spoiler apparatus, in which the air guiding arrangement is arranged, is located between the lower shell element and the mounting support.

4. The rear spoiler arrangement as claimed in claim 3, wherein the spoiler apparatus adjoins a rear window of the rear region of the motor vehicle.

5. The rear spoiler arrangement as claimed in claim 4, wherein the rear region of the motor vehicle includes a trunk.

6. The rear spoiler arrangement as claimed in claim 1, wherein the air guiding slat runs substantially perpendicularly to a vehicle longitudinal axis.

7. The rear spoiler arrangement as claimed in claim 6, wherein the air guiding slat has a surface element which is configured to deflect an air flow in a direction of the holding member.

8. The rear spoiler arrangement as claimed in claim 7, wherein the surface element of the air guiding slat is configured as a curved surface element.

9. The rear spoiler arrangement as claimed in claim 1, wherein the air guiding arrangement further includes a frame arrangement with air guiding faces and visual protection faces.

10. A motor vehicle having a rear mounted engine with a rear spoiler arrangement as claimed in claim 1, wherein the rear region is of a closed configuration.

11. The motor vehicle as claimed in claim 10, wherein the rear region is configured as a trunk lid or as a rear window.

12. The rear spoiler arrangement as claimed in claim 1, wherein the air flow path to the intercooler of the rear mounted engine of the motor vehicle extends through an opening in the holding member.

13. A rear spoiler arrangement for a motor vehicle, the rear spoiler arrangement comprising:
- a spoiler apparatus including an opening that provides an air flow path to an intercooler of a rear mounted engine of the motor vehicle;
- a holding member for the spoiler apparatus; and
- an air guiding arrangement arranged in the opening of the spoiler apparatus,
- wherein the air guiding arrangement includes an air guiding slat configured to guide an air flow through the air flow path to the intercooler of the rear mounted engine, and
- wherein the air guiding slat is movably mounted and is configured to be driven by a drive device.

14. A rear spoiler arrangement for a motor vehicle, the rear spoiler arrangement comprising:
- a mounting support provided in a rear region of the motor vehicle; and
- a spoiler apparatus mounted on the mounting support, the spoiler apparatus including:
  - a lower shell element,
  - a wing element mounted on the lower shell element, wherein the wing element is configured to be extended from the lower shell element into a deployed position and retracted from the deployed position towards the lower shell element,
  - an opening located between the lower shell element and the mounting support, the opening providing an air flow path to an intercooler of a rear mounted engine of the motor vehicle,
  - an air guiding arrangement arranged in the opening located between the lower shell element and the mounting support, the air guiding arrangement including a frame arrangement and an air guiding slat,
- wherein the air guiding slat is movably mounted in the frame arrangement and is configured to divert airflow in the direction of the intercooler.

15. The rear spoiler arrangement as claimed in claim 14, wherein the frame arrangement includes an upper air guiding face and a lower air guiding face.

16. The rear spoiler arrangement as claimed in claim 15, wherein the air guiding slat is disposed between the upper air guiding face and the lower air guiding face.

17. The rear spoiler arrangement as claimed in claim 16, wherein the frame arrangement further includes visual protection faces configured to cover the deploying mechanism of the wing.

18. The rear spoiler arrangement as claimed in claim 14, wherein the air guiding slat is configured to be driven by a drive device in order to adapt to different operating situations.

* * * * *